US007383302B2

(12) United States Patent
Cohen et al.

(10) Patent No.: US 7,383,302 B2
(45) Date of Patent: Jun. 3, 2008

(54) METHOD AND SYSTEM FOR PROVIDING A COMMON COLLABORATION FRAMEWORK ACCESSIBLE FROM WITHIN MULTIPLE APPLICATIONS

(75) Inventors: Mitchell A. Cohen, Yorktown Heights, NY (US); Fenno F. Heath, III, Woodbridge, CT (US); Hui Lei, Scarsdale, NY (US); Chung-Sheng Li, Scarsdale, NY (US); Jenny S. Li, Stamford, CT (US); Rakesh Mohan, Cortlandt Manor, NY (US); Nitinchandra R. Nayak, Ossining, NY (US); Josef Schiefer, Scarsdale, NY (US); Stephen Stibler, Cortlandt Manor, NY (US); Maroun Touma, Redding, CT (US)

(73) Assignee: International Business Machines Corporation, Armonk, NY (US)

( * ) Notice: Subject to any disclaimer, the term of this patent is extended or adjusted under 35 U.S.C. 154(b) by 795 days.

(21) Appl. No.: 10/662,617

(22) Filed: Sep. 15, 2003

(65) Prior Publication Data

US 2005/0060371 A1    Mar. 17, 2005

(51) Int. Cl.
*G06F 15/16* (2006.01)
(52) U.S. Cl. .................. 709/205; 709/223; 709/245
(58) Field of Classification Search .......... 709/205, 709/204
See application file for complete search history.

(56) References Cited

U.S. PATENT DOCUMENTS

| | | | |
|---|---|---|---|
| 5,768,580 A * | 6/1998 | Wical | 707/102 |
| 6,289,338 B1 * | 9/2001 | Stoffel et al. | 707/3 |
| 6,311,194 B1 * | 10/2001 | Sheth et al. | 715/505 |
| 6,424,973 B1 * | 7/2002 | Baclawski | 707/102 |
| 6,513,059 B1 * | 1/2003 | Gupta et al. | 709/202 |
| 6,560,595 B1 * | 5/2003 | Sanders et al. | 707/2 |
| 6,640,231 B1 * | 10/2003 | Andersen et al. | 707/102 |
| 6,728,692 B1 * | 4/2004 | Martinka et al. | 706/45 |

(Continued)

FOREIGN PATENT DOCUMENTS

GB         2399665 A    *    9/2004

(Continued)

OTHER PUBLICATIONS

☐☐Yanmei Wang et al. "Ontology-based web knowledge management", ICICS-PCM 2003, pp. 1859-1863.*

(Continued)

*Primary Examiner*—Patrice Winder
(74) *Attorney, Agent, or Firm*—Gibb & Rahman, LLC; Derek S. Jennings (57) ABSTRACT

The invention provides a system adapted to enable contextual collaboration within a computer network. The invention provides a collaboration manager that supports manipulation of collaboration spaces. The collaboration spaces contain one or more collaboration elements that have potentially different collaboration modalities. The context manager maintains resources and resource interrelationships within contexts. The resources can include collaboration elements, processes, tasks, business objects, users, and/or roles. A view generator selects a set of the resources to be displayed to a user of the computer network. The invention also includes an interface adapted to allow applications to specify commands to manipulate collaboration spaces, commands to maintain resources and resource interrelationships within contexts, and queries for context-sensitive views.

20 Claims, 5 Drawing Sheets

U.S. PATENT DOCUMENTS

| | | | |
|---|---|---|---|
| 6,892,238 B2 * | 5/2005 | Lee et al. | 709/224 |
| 6,957,214 B2 * | 10/2005 | Silberberg et al. | 707/4 |
| 7,027,974 B1 * | 4/2006 | Busch et al. | 704/4 |
| 2003/0018616 A1 * | 1/2003 | Wilbanks et al. | 707/2 |
| 2003/0018719 A1 * | 1/2003 | Ruths et al. | 709/205 |
| 2003/0233224 A1 * | 12/2003 | Marchisio et al. | 704/4 |
| 2004/0010491 A1 * | 1/2004 | Riedinger | 707/3 |
| 2004/0054690 A1 * | 3/2004 | Hillerbrand et al. | 707/104.1 |
| 2004/0117346 A1 * | 6/2004 | Stoffel et al. | 707/1 |
| 2004/0220893 A1 * | 11/2004 | Spivack et al. | 706/46 |
| 2005/0080656 A1 * | 4/2005 | Crow et al. | 705/8 |
| 2005/0114475 A1 * | 5/2005 | Chang et al. | 709/220 |
| 2005/0114789 A1 * | 5/2005 | Chang et al. | 715/779 |
| 2005/0138173 A1 * | 6/2005 | Ha et al. | 709/225 |
| 2005/0262128 A1 * | 11/2005 | Goodwin et al. | 707/102 |
| 2005/0267871 A1 * | 12/2005 | Marchisio et al. | 707/3 |
| 2006/0218177 A1 * | 9/2006 | Chang et al. | 707/102 |

FOREIGN PATENT DOCUMENTS

| | | | |
|---|---|---|---|
| WO | WO 0115042 A2 * | 3/2001 | |
| WO | WO 0205137 A2 * | 1/2002 | |
| WO | WO 0231680 A1 * | 4/2002 | |
| WO | WO 02080028 A1 * | 10/2002 | |
| WO | WO 02099725 A1 * | 12/2002 | |
| WO | WO 2005010653 A2 * | 2/2005 | |
| WO | WO 2006020343 A1 * | 2/2006 | |
| WO | WO 2006071928 A2 * | 7/2006 | |

OTHER PUBLICATIONS

Wenjie Li et al. "Ontology based intelligent information retrieval system", Canadian Conference on Electrical and Computer Engineering, 2004, vol. 1, pp. 373-376.*

Abilio Fernandes, SNOBASE, May 2004, 18 pages.*

Liu Jin et al. "A Methodology for Acquisition of Software Component Attribute Ontology", Proceedings of the Fourth International Conference on Computer and Information Technology, 2004, pp. 1058-1064.*

Czejdo, B et al. "Automatic Generation of Ontology Based Annotations in XML and their use in Retrieval Systems", Proceedings of the First International Conference on Web Information Systems Engineering, 2000, vol. 1, pp. 296-3001.*

Deloule, F et al. "Ontologies and Knowledge Representation", Intelligent Systems for the 21st Century, IEEE International Conference on Systems, Man and Cybernetics, 1995, vol. 5, pp. 22-25.*

Bo Hu et al. "Ontology-based Medical Image Annotation with Description Logics", Proceedings of the 15th IEEE Internatinal Conference on Tools with Artificial Intelligence, 2003, pp. 77-82.*

Deborah,L McGuinness et al. "DAML+OIL: An Ontology Language for the Semantic Web", IEEE Intelligent Systems, vol. 17, No. 5, 2002 pp. 72-80.*

Prasanna Ganesan et al., Context Awareness in Ad-hoc Communications, 2003 IEE Pacific Rim Conference on Communications, Computers and Signal Processing, Aug. 2003, vol. 2, pp. 919-922.*

* cited by examiner

METHOD AND SYSTEM FOR PROVIDING A COMMON COLLABORATION FRAMEWORK ACCESSIBLE FROM WITHIN MULTIPLE APPLICATIONS

BACKGROUND OF THE INVENTION

1. Field of the Invention

The present invention generally relates to collaboration between network users and more particularly to an improved system and methodology that allows network users to seamlessly collaborate with each other using multiple unrelated applications.

2. Description of the Related Art

Collaboration is the process of interaction amongst one or more users. Collaboration technologies allow users to collaborate with each other. User collaboration technologies have existed for some time in various forms such as telephone, fax, e-mail, bulletin boards, etc. Today, many enterprise portals, web sites, and also software applications provide their users with advanced collaboration capabilities such as online presence awareness (aka: buddy lists) of other users, instant messaging between users, discussion threads, and team rooms.

SUMMARY OF THE INVENTION

The invention provides a system adapted to enable contextual collaboration within a computer network. In the invention, a collaboration manager supports manipulation of collaboration spaces. The collaboration spaces contain one or more collaboration elements that have potentially different collaboration modalities. The context manager maintains resources and resource interrelationships within contexts. The resources can include collaboration elements, processes, tasks, business objects, users, and/or roles. A view generator selects a set of the resources to be displayed to a user of the computer network. The invention also may include an interface adapted to allow applications to specify commands to manipulate collaboration spaces, commands to maintain resources and resource interrelationships within contexts, and queries for context-sensitive views.

In the invention, commands to manipulate collaboration spaces include managing lifecycles of the collaboration spaces, maintaining membership lists, user profiles, and role associations in the collaboration spaces. The invention adds and removes the collaboration elements, and performs modality-specific operations on the collaboration elements. The commands to maintain resources and resource interrelationships may include: creating, deleting, opening, and closing of the contexts. The invention may add resources and associations between the resources in the contexts, and then, may remove the resources and the associations from the contexts. The queries for context-sensitive views may include retrieving resources related to a given context, retrieving resources related to a given resource within a context, and retrieving resources related to a given resource across contexts.

The collaboration manager may store information on collaboration spaces, and may be coupled to adapters for plugging in external collaboration capabilities. The adapters each implement a standardized and modality-specific interface. The context manager may describe associated resources and resource interrelationships. The view generator may specify policies for view generation.

The invention provides collaboration between different applications used by multiple users in a computerized network. At least one collaboration space supports different modes of collaboration, wherein the users collaborate through the different applications using the different modes of collaboration maintained in the collaboration space. The application program interfaces connect the collaboration space to the applications, thereby making collaboration content available to all the applications. All the collaboration content is transparently accessible by the users natively from within each application.

The contextual view generator may select a limited set of resources maintained within the collaboration space to be displayed to a user of the computerized network based on user needs. The collaboration manager may maintain the collaboration space. The collaboration manager also preferably creates, deletes, archives, searches, and queries the collaboration spaces. The collaboration manager may interact with collaboration technology servers. The application program interfaces may create instances of collaborative interaction within the collaboration space.

The invention also includes a method for enabling contextual collaboration within a computer network. The method creates collaboration spaces containing one or more collaboration elements of potentially different collaboration modalities. The method maintains resources and resource interrelationships within contexts. The resources include collaboration elements, processes, tasks, business objects, users, and/or roles. The method selects a set of the resources to be displayed to a user.

The invention further provides a service for enabling contextual collaboration within a computer network. The service creates collaboration spaces containing one or more collaboration elements of potentially different collaboration modalities, maintains resources and resource interrelationships within contexts, the resources including at least one of collaboration elements, processes, tasks, business objects, users, and roles, and selects a set of the resources to be displayed to a user.

The service may also manages lifecycles of the collaboration spaces, maintain membership lists, user profiles, and role associations in the collaboration spaces, add and removes the collaboration elements, and perform modality-specific operations on the collaboration elements. If the service maintains the membership lists, the service creates, deletes, opens, and closes the contexts; adds resources and associations between the resources in the contexts; and removes the resources and the associations from the contexts. If the service selects a set of resources to be displayed, the service retrieves resources related to a given context, retrieves resources related to a given resource within a context, and retrieves resources related to a given resource across contexts.

The service may also store information on collaboration spaces, redirect operations on the collaboration elements to external collaboration capabilities, use a context model to describe resource associations and resource interrelationships, and maintain a set of view rules adapted to specify policies for view generation.

These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. Many changes and modifications may be made within the scope of the present invention without departing from the spirit thereof, and the invention includes all such modifications.

BRIEF DESCRIPTION OF THE DRAWINGS

The invention will be better understood from the following detailed description of preferred embodiments of the invention with reference to the drawings, in which.

DETAILED DESCRIPTION OF PREFERRED EMBODIMENTS OF THE INVENTION

The present invention and the various features and advantageous details thereof are explained more fully with reference to the nonlimiting embodiments that are illustrated in the drawings and detailed in the following description. It should be noted that the features illustrated in the drawings are not necessarily drawn to scale. Descriptions of well-known components and processing techniques are omitted so as to not unnecessarily obscure the present invention in detail.

In most cases, collaboration capabilities can be considered to be general and not specific to any business context. The invention defines contextual collaboration as the capability for multiple role players to interact with each other within a specific context. Contextual collaboration differs from general-purpose collaboration in that it can be initiated within a specific context such as a software application, business process, business object, or some business artifact and thereby allowing only a relevant set of participants within a larger universe of users to collaborate. Additionally, for contextual collaboration to be most effective, the user should be able to access the collaboration technology from within the user's environment, such as a software application. For example, a product designer should be able to collaborate with others from within the familiar user interface of the design application software.

The problem addressed by this invention is that the contextual collaboration data accessible natively from within one application is not carried over for access from within the next application. One way to get around this problem is to utilize a separate collaboration application that is outside of the other applications and that has its own user interface for access. However, with such a separate collaboration application, the user is forced to leave the application environment to access the collaboration application user interface. To illustrate this problem, consider the new product design process, which uses multiple applications for various tasks. Many of these applications provide a contextual collaboration environment to their users to interact with other process participants such as designers, product manager, parts procurement manager, etc. However, as the user moves from using the product design application to the parts catalog management application, all collaborative interaction data associated with the design decision-making would no longer be available to the user within the parts catalog management software.

Figure 1:
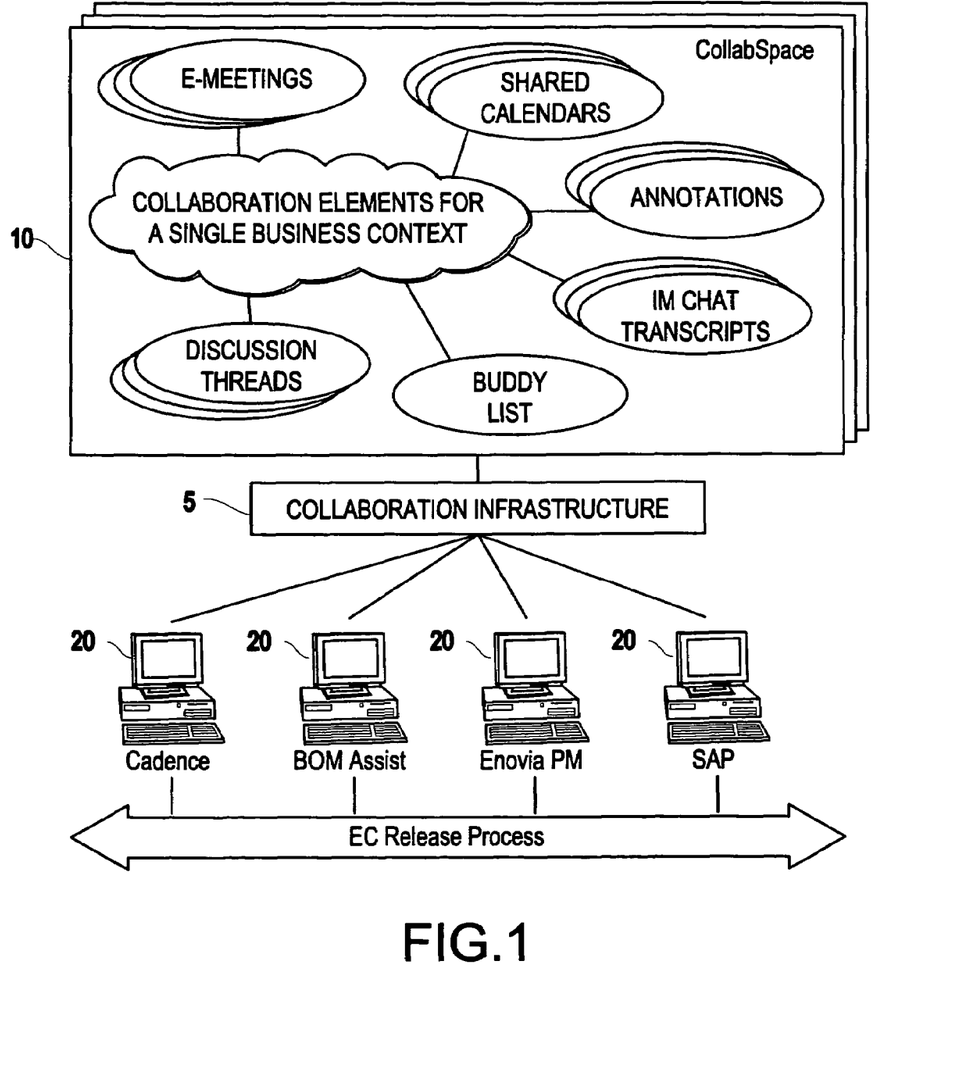
FIG. 1 is a schematic diagram of system according to the invention.

As shown in FIG. 1, the invention includes a system and methodology that addresses this problem by creating a collaboration infrastructure 5 that provides collaboration capability to any business applications 20. This infrastructure makes collaboration spaces "CollabSpaces" 10 available across multiple applications 20 that can be accessed from within the application's native user interface. Additionally, the infrastructure also has features to address the issues of organizing and managing multiple such collaboration spaces 10.

A CollabSpace 10 represents an aggregation of various collaboration modality instances (different modes of collaboration) associated with a business context. The collaboration modality refers to a distinct collaboration capability provided by a specific technology such as e-meeting, discussion threads, instant messaging chat transcripts, online presence awareness (buddy lists), annotations, team rooms, etc. Additionally, the business artifact refers to the interrelated aspects of a business process within which a collaboration may occur. A CollabSpace 10 can be requested by any business application 20 and once created it is available to other authorized business applications 20.

Figure 2:
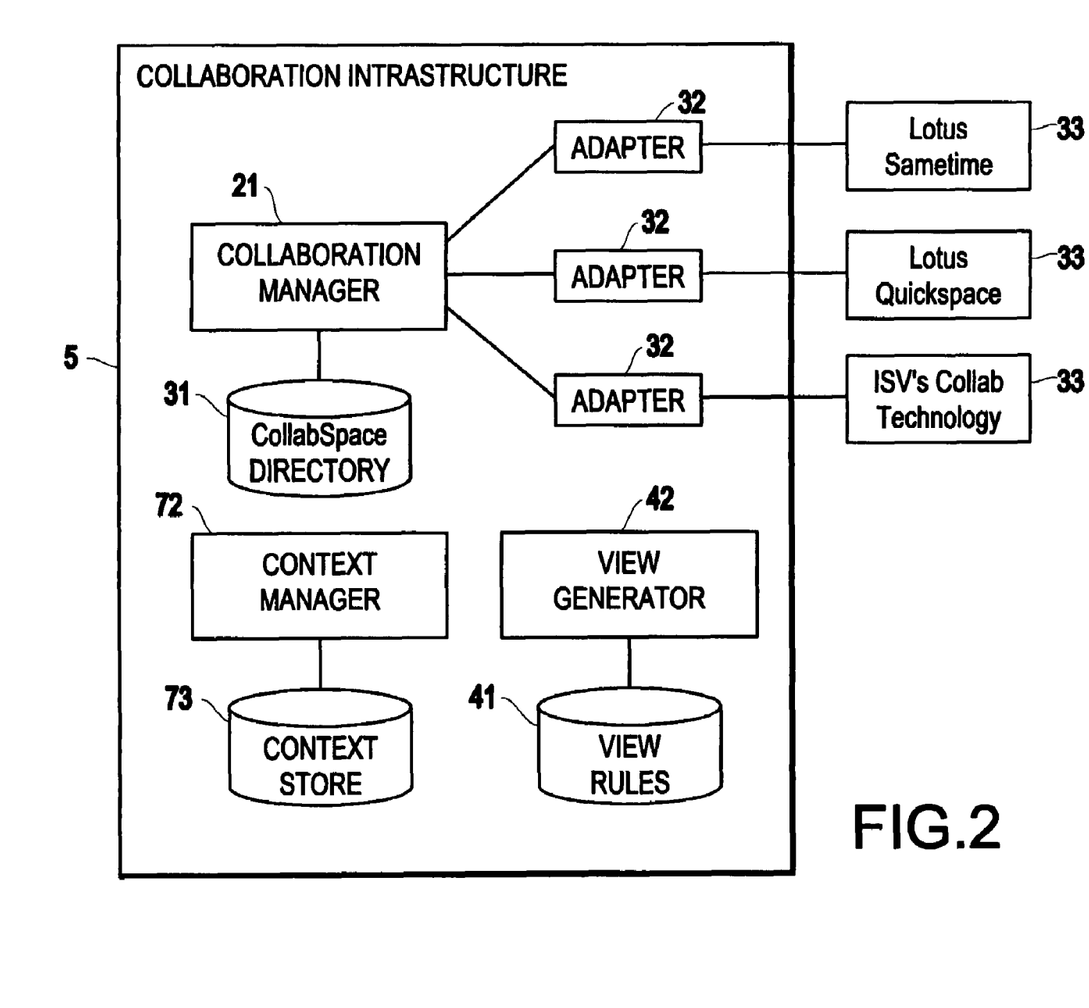
FIG. 2 is a schematic diagram of system according to the invention.

As shown in FIG. 2, the collaboration infrastructure 5 includes the following components: a collaboration manager "CollabManager" 21; Context Manager 72; and View Generator 42. The CollabManager 21 handles requests for CollabSpaces 10 from various business applications 20 and manages the lifecycle functions of these CollabSpaces 10 including, creation, deletion, and archival. It also provides search and query function on its set of CollabSpaces 10 to locate CollabSpaces 10 by various criteria as well as find the attribute name and value information for each CollabSpace 10.

The CollabManager 21 interacts with various Collaboration technology servers 33 such as Lotus QuickPlace® server (for team rooms), Lotus Sametime® server (for online awareness and instant messaging) both available from International Business Machines Corp., Armonk, N.Y., USA , and others through adapters 32. The adapters 32 implement standard interfaces for creating an instance of collaborative interaction (such as a team room, buddy list, threaded discussion) as well as other management functions. In case the adapters 32 are implemented as web services, the adapter interfaces can be represented in Web Services Definition Language (WSDL).

The CollabManager 21 itself provides interfaces for lifecycle management functions, search and query functions, and update functions for CollabSpaces 10. The various business applications 20 interact with the CollabManager 21 through this interface. Some representative function calls are as follows:

Lifecycle Management commands:
CreateCollabSpace (Name, Description, ContextID)
DeleteCollabSpace (CollabSpaceID)
ModifyMembersOfACLGroup (CollabSpaceID, ACLGroup, MemberList)
Search and Query functions:
GetCollabSpaceDetails (CollabSpaceID)
ListCollabSpacesByUser (UserDN)
ListCollabSpacesByContextID (ContextID)

The CollabManager 21 stores the details of the collaboration spaces 10 within a CollabSpace Directory 31. Such a directory 31 can be implemented using a relational database or by using LDAP (lightweight directory access protocol) services.

A CollabSpace 10 can contain pointers to several collaboration modalities and also contain various attributes associated with these modalities. However, a user may not need access to all this information for the task at hand. For example, the universe of people participating within a particular contract negotiation process may contain several role players including contract initiator (sales person), counter party (customer), contract administrator, department manager (sales manager), financial analyst, legal expert, etc. However, the buddy list when displayed to the customer may contain references only to the salesperson and the sales manager and no references to the other role players (i.e., financial analyst, contract administrator, legal expert). On the other hand, the salesperson initiating the contract will see the entire set of participants in order to initiate any collaborative interaction with them in the context of the contract being negotiated.

Therefore, the invention provides a View Generator 42 within the middleware infrastructure 5. The View Generator 42 receives requests from the business applications 20 being collaboration enabled. The output of the View Generator 42 is a set of collaboration modalities that should be included in the presentation to the user of the business application 20. The View Generator 42 also returns the context-specific collaboration content to be displayed to a user based on specific business rules.

The View Generator 42 accesses a library of context rules 41 and executes those that are relevant to the current business context. The View Generator 42 depends on querying the Context Manager 72 and the CollabManager 21 to access the business environment details and collaboration space details respectively. The context rules 41 can be modeled using industry standard process ontologies or proprietary schemes and implemented using XML technology.

Figure 3:
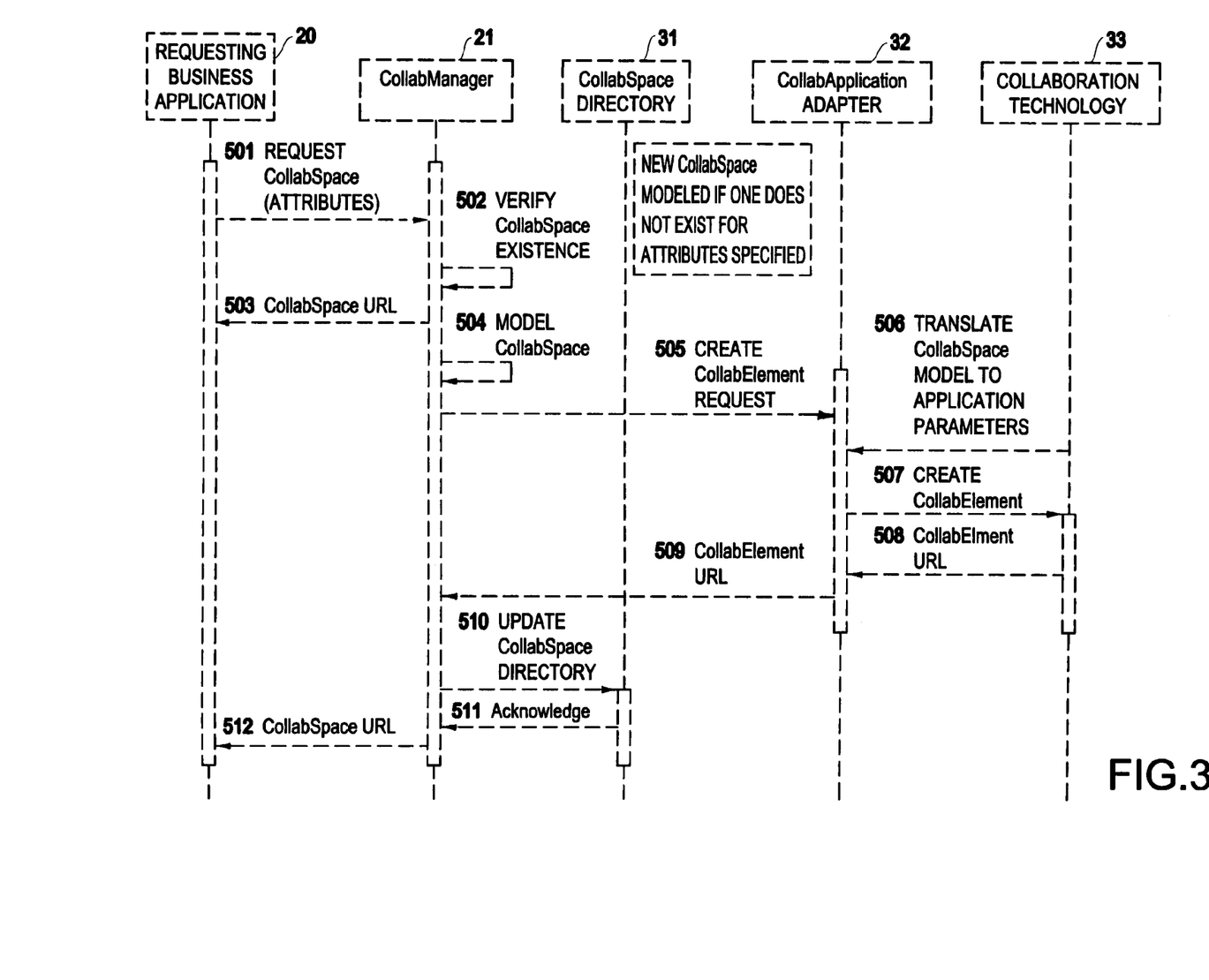
FIG. 3 is a flow diagram illustrating a preferred method of the invention.
Figure 4:
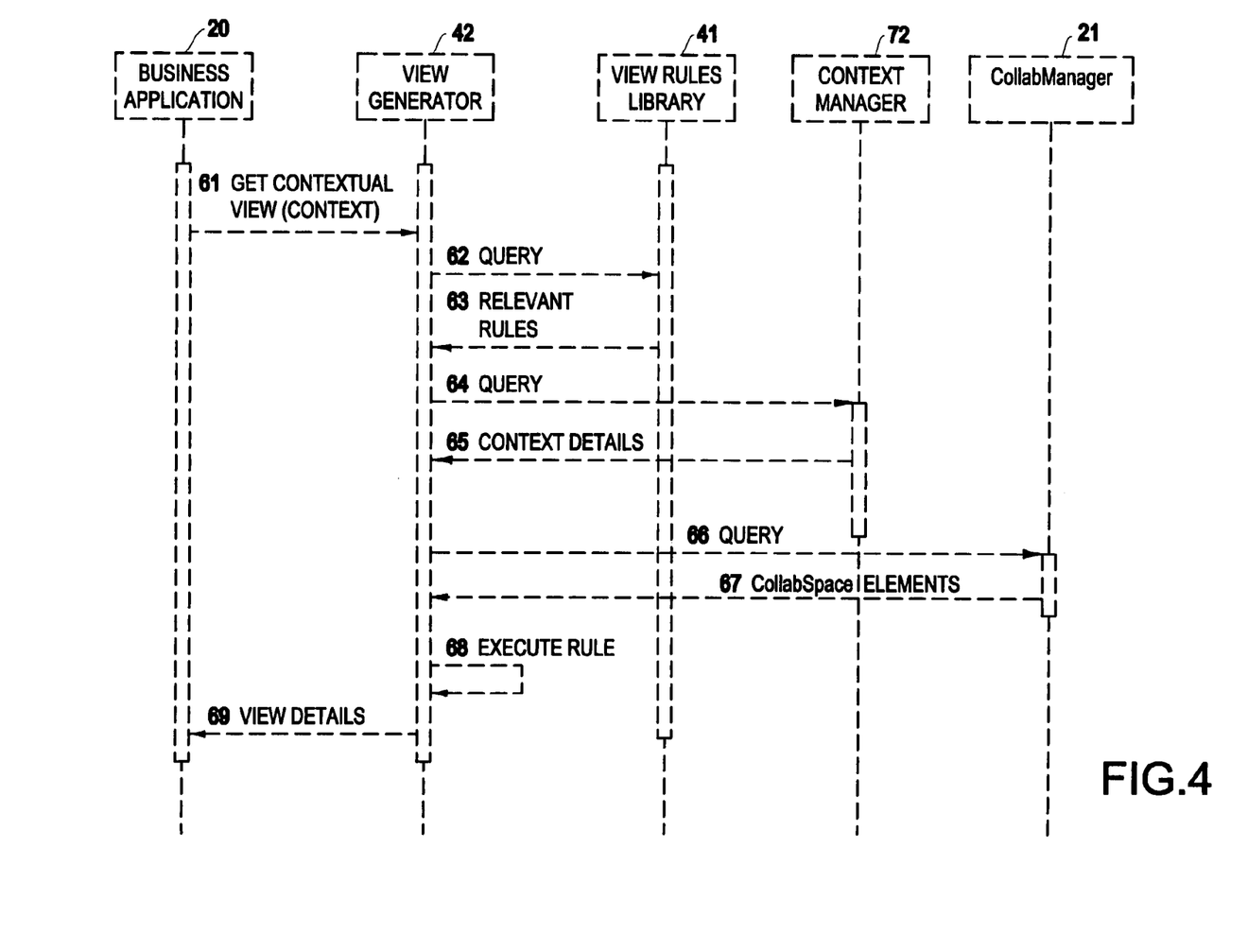
FIG. 4 is a flow diagram illustrating a preferred method of the invention.

FIG. 3 outlines the sequence of activities that takes place between various sub-systems during a request for a collaboration space by a business application 20, and FIG. 4 shows the request for context specific collaboration content to be presented to the end user via an application user interface. More specifically, in item 501, a request from the requesting business application 20 is made to the collaboration manager 21. Then, in item 502, the collaboration manager verifies the existence of the collaboration space 10 from the collaboration space directory 31. Then, the collaboration manager 21 issues a collaboration space URL 503 if item 502 indicates that one previously exists. Alternatively, the processing shown in items 504-512 is undertaken. In item 504, the collaboration manager constructs a new model for the collaboration space if one does not exist for the context specified. In item 505, the collaboration manager 21 creates a collaboration element request to the collaboration application adapter 32. In item 506, the collaboration application adapter 32 translates the collaboration model to application parameters. In item 507, the collaboration application adapter 32 creates the collaboration elements using the collaboration technology 33, which in turn returns the collaboration element URL 508. The URL is forwarded back to the collaboration manager 21 in item 509. In item 510, the collaboration manager updates the collaboration space directory, which returns acknowledgment 511. Then, item 512 represents the collaboration manager 21 returning the newly created collaboration space URL to the requesting business application 20.

In FIG. 4, the process of determining a contextual view of the collaboration space begins in item 61 where the business application 20 produces a request to get a contextual view. In item 62, the view generator 42 sends a query to the view rules library 41, which in turn returns the relevant rules 63. A query is also sent from the contextual view generator 42 to the context manager 72 in item 64. The context manager 72 returns details of the current business context in item 65. The view generator 42 then sends a query 66 to the collaboration manager 21 which returns the elements of the CollabSpace in item 67. With such information, the view generator 42 executes the rule in item 68 and provides the viewing details to the business application 20 in item 69.

Figure 5:
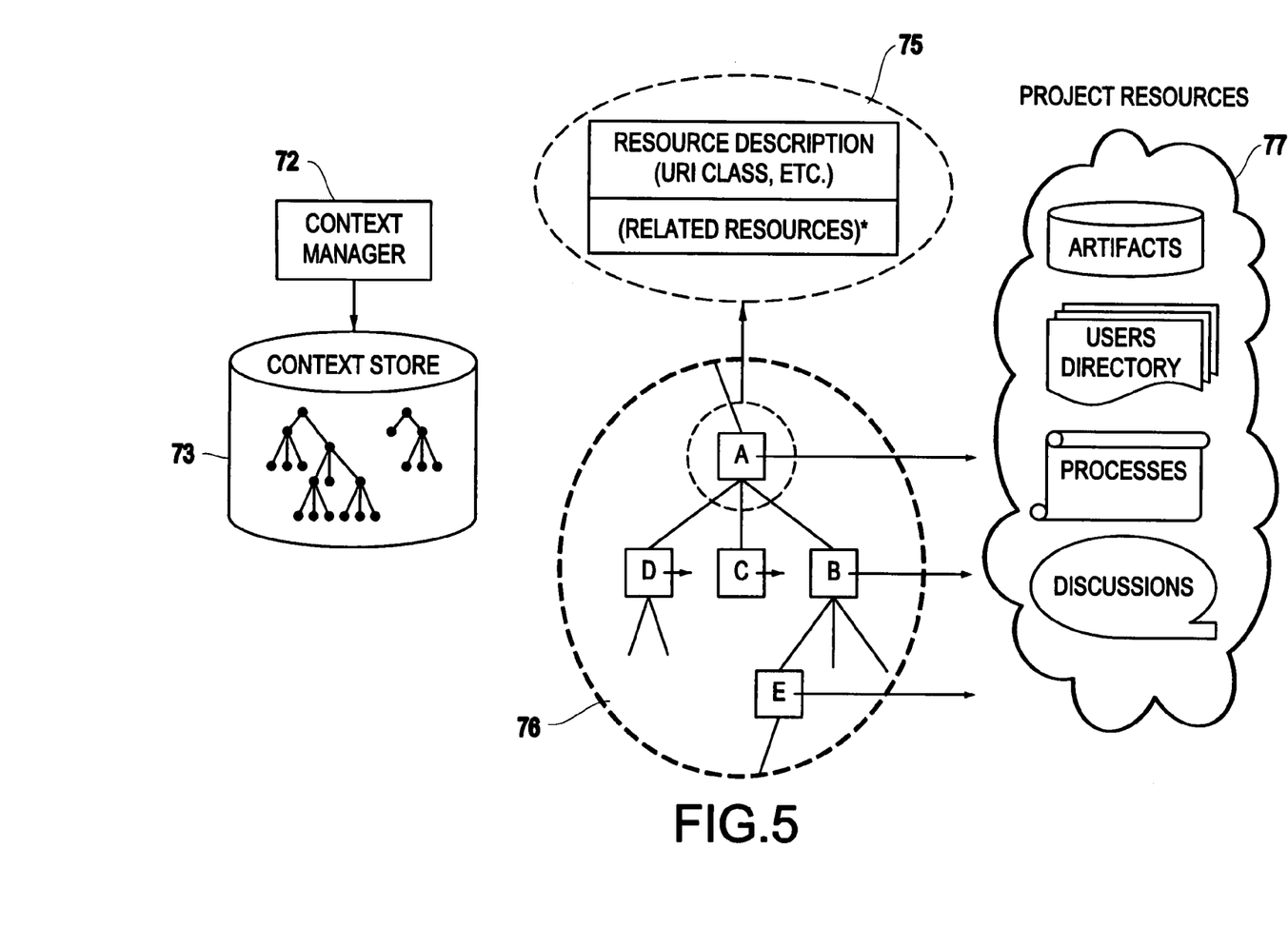
FIG. 5 is a schematic diagram of system according to the invention.

As illustrated in FIG. 5, the Context Manager 72 maintains a Context Store 73 that represents an aggregation of the contextual relations that exists between the different resources 77. These relations can be modeled using a non-cyclical graph or a tree 76. For all intended purposes, the Context Store 73 does not have to deal with the semantic nature of the relation, nor does it have to deal with how and where the resource is physically stored, because the context store 73 simply maintains the structure of the relationship and provides linkage between the different resources.

The contextual information that is encoded by each node consists of the primary resource that a context deals with, and all the resources that are directly related to primary resource. The primary resource is encoded using a Resource Descriptor block 75 that allows the system to uniquely identify the resource. URI is a well-known mechanism in the art that can be used in lieu of, or part of the Resource Descriptor block. It might be however desired to store additional information such as a CLASS attribute (i.e., person, process, document, discussion, etc.) or MIME type (although most standard protocols can return this information based on its URI) or type of relation to parent node (if so desired to be used in the application semantic), etc. An application 20 can access a specific context by referring to the corresponding node unique identifier, which is generated by the Context Manager 72. Alternatively the application can specify a path, or part of a path, that identifies the resources that the application deals with to locate the corresponding context. A fully qualified path specifies all the nodes that are visited to reach the desire context. For example, the path "/project:STB/design document: physical layout v1/discussion:heat dissipation" refers to the context that is part of the discussion about heat dissipation in version 1 of the design document of the Set Top Box project. A partially qualified path allows for ambiguity and may identify more than one context. For example, "/project:contract negotiation/ . . . /discussion: terms and conditions" refers to all the contexts for all the discussions that are in the database that relate to the terms and conditions of any contract negotiation project. The Context Manager 72 provides the necessary API for creating, retrieving and/or modifying a context requested by the business application 20.

The tree organization 76 of the Context Store 73 allows the system to implement a hierarchical view of the contextual relationship and navigate the contextual space from the most general context (root node) to the more specific contexts (leaf nodes). It is also possible to provide direct access to a specific node of the tree. An index table or other optimization techniques that are well known in the art is used to accomplish this.

Resources that are already defined as part of the parent context do not have to be repeated for a child context and can be easily derived by inheritance. Furthermore, the hierarchical organization of the Context Store 73 allows the system to use the context encoded by a parent node to access all the resources that are encoded by a child or grandchild nodes. For example, if B is a child node of node A, than all the contextual information that is encoded by node B should also be accessible to node A. In this case, the resource that is attached to node B is said to be directly related to the resource attached to node A, while the resources that are attached to a child node of B are said to be indirectly related to the resource attached to node A but are still accessible from the context encoded by child node B.

The above drawings also illustrate a service for enabling contextual collaboration within a computer network. The service creates collaboration spaces containing one or more collaboration elements of potentially different collaboration modalities, maintains resources and resource interrelationships within contexts, the resources including at least one of collaboration elements, processes, tasks, business objects, users, and roles, and selects a set of the resources to be displayed to a user.

The service also manages lifecycles of the collaboration spaces, maintains membership lists, user profiles, and role associations in the collaboration spaces, adds and removes the collaboration elements, and performs modality-specific operations on the collaboration elements. When the service maintains the membership lists, the service creates, deletes, opens, and closes the contexts; adds resources and associations between the resources in the contexts; and removes the resources and the associations from the contexts. When the service selects a set of resources to be displayed, the service retrieves resources related to a given context, retrieves resources related to a given resource within a context, and retrieves resources related to a given resource across contexts.

The service also stores information on collaboration spaces, redirects operations on the collaboration elements to external collaboration capabilities, uses a context model to describe resource associations and resource interrelationships, and maintains a set of view rules adapted to specify policies for view generation.

Thus, as shown above, the invention provides a system or a service adapted to enable contextual collaboration within a computer network. In the invention, a collaboration manager supports manipulation of collaboration spaces. The collaboration spaces contain one or more collaboration elements that have potentially different collaboration modalities. The context manager is adapted to maintain resources and resource interrelationships within contexts. The resources can include collaboration elements, processes, tasks, business objects, users, and/or roles. A view generator selects a set of the resources to be displayed to a user of the computer network. The invention also includes an interface adapted to allow applications to specify commands to manipulate collaboration spaces, commands to maintain resources and resource interrelationships within contexts, and queries for context-sensitive views.

In the invention, commands to manipulate collaboration spaces include managing lifecycles of the collaboration spaces, maintaining membership lists, user profiles, and role associations in the collaboration spaces. The invention adds and removes the collaboration elements, and performs modality-specific operations on the collaboration elements. The commands to maintain resources and resource interrelationships include: creating, deleting, opening, and closing of the contexts. The invention adds resources and associations between the resources in the contexts, and then, removes the resources and the associations from the contexts. The queries for context-sensitive views include retrieving resources related to a given context, retrieving resources related to a given resource within a context, and retrieving resources related to a given resource across contexts.

The collaboration manager stores information on collaboration spaces. The collaboration manager plugs in external collaboration capabilities. The adapters each implement a standardized and modality-specific interface. The context manager describes associated resources and resource interrelationships. The view generator specifies policies for view generation.

The invention provides collaboration between different applications used by multiple users in a computerized network. At least one collaboration space supports different modes of collaboration, wherein the users collaborate through the different applications using the different modes of collaboration maintained in the collaboration space. The application program interfaces connect the collaboration space to the applications, thereby making collaboration content available to all the applications. All the collaboration content is transparently accessible by the users natively from within each application.

The contextual view generator selects a limited set of resources maintained within the collaboration space to be displayed to a user of the computerized network based on user needs. The collaboration manager maintains the collaboration space. The collaboration manager also creates, deletes, archives, searches, and queries the collaboration spaces. The collaboration manager interacts with collaboration technology servers. The application program interfaces create instances of collaborative interaction within the collaboration space.

The invention also includes a method for enabling contextual collaboration within a computer network. The network creates collaboration spaces containing one or more collaboration elements of potentially different collaboration modalities. The method maintains resources and resource interrelationships within contexts. The resources include collaboration elements, processes, tasks, business objects, users, and/or roles. The method selects a set of the resources to be displayed to a user.

This invention can be used to enable capability for collaborative user interaction within applications in all industrial sectors. It can be offered as collaboration middleware to software vendors for building inter-operable collaboration capability into their applications. The invention can also be offered by a service provider as a service for enabling contextual collaboration within a computer network. The collaboration is an integral part of a familiar business application, so it is easy to use, and a common set of collaboration technologies that are used across multiple applications is easier to learn. Further, software application vendors do not have to develop their own collaboration software and the cross-application collaboration context improves marketability of Independent Software Vendor (ISV) software that is built using this infrastructure. Infrastructure based on adapters for various collaboration technologies allows plug-n-play of different collaboration technologies and improves flexibility. The common collaboration context across several applications, business processes, and business objects is appealing to customer specific embodiments.

The examples used herein are intended merely to facilitate an understanding of ways in which the invention may be practiced and to further enable those of skill in the art to practice the invention. Accordingly, the examples should not be construed as limiting the scope of the invention.

While the invention has been described in terms of preferred embodiments, those skilled in the art will recognize that the invention can be practiced with modification within the spirit and scope of the appended claims.

What is claimed is:

1. A system adapted to enable contextual collaboration of applications within a computer network, comprising:
    a collaboration manager adapted to support manipulation of collaboration spaces via commands from said applications, wherein said collaboration spaces comprise at least one collaboration element comprising different collaboration modalities, and wherein said collaboration spaces comprise pointers to said collaboration modalities and attributes associated with said collaboration modalities;
    native user interfaces of said applications adapted to access said collaboration spaces, wherein said collaboration spaces are transparently accessible to all of said applications, and wherein said native user interfaces allow collaboration through said applications using said collaboration modalities;
    a context manager adapted to maintain resources and resource interrelationships within contexts in a context store, wherein said resources comprise at least one of said collaboration elements, processes, tasks, business objects, users, and roles, wherein said context store comprises structures of said interrelationships and provides linkage between said resources, and wherein said context store lacks knowledge of how and where said resources are physically stored;
    a view generator adapted to select a set of said resources to be displayed to a user of said computer network; and
    a display adapted to display said set of said resources.

2. The system in claim 1, all the limitations of which are incorporated herein by reference, further comprising an interface adapted to allow applications to specify commands to manipulate collaboration spaces, commands to maintain resources and resource intefielationships within contexts, and queries for context-sensitive views.

3. The system in claim 2, all the limitations of which are incorporated herein by reference, wherein said commands to manipulate collaboration spaces include:
    managing lifecycles of said collaboration spaces;
    maintaining membership lists, user profiles, and role associations in said collaboration spaces;
    adding and removing said collaboration elements; and
    performing modality-specific operations on said collaboration elements.

4. The system in claim 2, all the limitations of which are incorporated herein by reference, wherein said commands to maintain resources and resource interrelationships include:
    creating, deleting, opening, and closing of said contexts;
    adding resources and associations between said resources in said contexts; and
    removing said resources and said associations from said contexts.

5. The system in claim 2, all the limitations of which are incorporated herein by reference, wherein said queries for context-sensitive views include:
    retrieving resources related to a given context;
    retrieving resources related to a given resource within a context; and
    retrieving resources related to a given resource across contexts.

6. The system in claim 1, all the limitations of which are incorporated herein by reference, wherein said collaboration manager is operatively coupled to a collaboration space directory adapted to store information on collaboration spaces.

7. The system in claim 6, all the limitations of which are incorporated herein by reference, wherein said collaboration manager is further operatively coupled to a collection of adapters adapted to connect to external collaboration capabilities, said adapters each implementing a standardized and modality-specific interface.

8. The system in claim 1, all the limitations of which are incorporated herein by reference, wherein said context manager is operatively coupled to a context model adapted to describe associated resources and resource interrelationships.

9. The system in claim 1, all the limitations of which are incorporated herein by reference, wherein said view generator is operatively coupled to a set of view rules adapted to specify policies for view generation.

10. A system adapted to provide collaboration between different applications used by multiple users in a computerized network, said system comprising:
    at least one collaboration space supporting different modes of collaboration, wherein said users collaborate through said different applications using said different modes of collaboration maintained in said collaboration space, wherein said collaboration space comprises at least one pointer to said modes of collaboration and attributes associated with said modes of collaboration;
    a collaboration manager adapted to support manipulation of said collaboration space via commands from said applications;
    native application program interfaces connecting said collaboration space to said applications, thereby making collaboration content available to all said applications, such that all said collaboration content is transparently accessible by said users natively from within each application;
    a context store adapted to maintain resources and resource interrelationships within contexts, wherein said resources including at least one of collaboration elements, processes, tasks, business objects, users, and roles, wherein said context store comprises structures of said interrelationships and provides linkage between said resources, and wherein said context store lacks knowledge of how and where said resources are physically stored; and
    a display adapted to display said collaboration space.

11. The system in claim 10, all the limitations of which are incorporated herein by reference, further comprising a contextual view generator adapted to select a limited set of resources maintained within said collaboration space to be displayed to a user of said computerized network based on user needs.

12. The system in claim 10, all the limitations of which are incorporated herein by reference, wherein said collaboration manager is adapted to maintain said collaboration space.

13. The system in claim 12, all the limitations of which are incorporated herein by reference, wherein said collaboration manager is further adapted to create, delete, archive, and search and query said collaboration spaces.

14. The system in claim 12, all the limitations of which are incorporated herein by reference, wherein said collaboration manager is further adapted to interact with collaboration technology servers.

15. The system in claim 10, all the limitations of which are incorporated herein by reference, wherein said application program interfaces are adapted to create instances of collaborative interaction within said collaboration space.

16. A system adapted to enable contextual collaboration of applications within a computer network, comprising:

a collaboration manager adapted to support manipulation of collaboration spaces via commands from said applications, wherein said collaboration spaces comprise at least one collaboration element comprising different collaboration modalities, and wherein said collaboration spaces comprise pointers to said collaboration modalities and attributes associated with said collaboration modalities;

native user interfaces of said applications adapted to access said collaboration spaces, wherein said collaboration spaces are transparently accessible to all of said applications, and wherein said native user interfaces allow collaboration through said applications using said collaboration modalities;

a context manager adapted to maintain resources and resource interrelationships within contexts in a context store, wherein said resources comprise at least one of said collaboration elements, processes, tasks, business objects, users, and roles, wherein said context store comprises structures of said interrelationships and provides linkage between said resources, and wherein said context store lacks knowledge of how and where said resources are physically stored;

a view generator adapted to select a set of said resources to be displayed to a user of said computer network;

an interface adapted to allow applications to specify commands to manipulate collaboration spaces, commands to maintain resources and resource interrelationships within contexts, and queries for context-sensitive views, wherein said commands to manipulate collaboration spaces include:
managing lifecycles of said collaboration spaces;
maintaining membership lists, user profiles, and role associations in said collaboration spaces;
adding and removing said collaboration elements; and
performing modality-specific operations on said collaboration elements, wherein said commands to maintain resources and resource interrelationships include:
creating, deleting, opening, and closing of said contexts;
adding resources and associations between said resources in said contexts; and
removing said resources and said associations from said contexts, and wherein said queries for context-sensitive views include:
retrieving resources related to a given context,
retrieving resources related to a given resource within a context, and
retrieving resources related to a given resource across contexts; and a display adapted to display said set of said resources.

17. The system in claim 16, all the limitations of which are incorporated herein by reference, wherein said collaboration manager is operatively coupled to a collaboration space directory adapted to store information on collaboration spaces.

18. The system in claim 17, all the limitations of which are incorporated herein by reference, wherein said collaboration manager is further operatively coupled to a collection of adapters adapted to connect to external collaboration capabilities, said adapters each implementing a standardized and modality-specific interface.

19. The system in claim 16, all the limitations of which are incorporated herein by reference, wherein said context manager is operatively coupled to a context model adapted to describe associated resources and resource interrelationships.

20. The system in claim 16, all the limitations of which are incorporated herein by reference, wherein said view generator is operatively coupled to a set of view rules adapted to specify policies for view generation.

* * * * *